[19] US 8,700,214 B2
[45] Date of Patent: Apr. 15, 2014

(12) United States Patent
Fortman

(10) Patent No.: US 8,700,214 B2
(45) Date of Patent: Apr. 15, 2014

(54) TRANSFER ASSEMBLY

(75) Inventor: Ronald Fortman, El Leersum (NL)

(73) Assignee: BluePrint Holding B.V., Woerden (NL)

( * ) Notice: Subject to any disclaimer, the term of this patent is extended or adjusted under 35 U.S.C. 154(b) by 250 days.

(21) Appl. No.: 12/942,392

(22) Filed: Nov. 9, 2010

(65) Prior Publication Data
US 2011/0224821 A1 Sep. 15, 2011

(30) Foreign Application Priority Data
Nov. 9, 2009 (NL) ...................................... 2003771

(51) Int. Cl.
*G06F 7/00* (2006.01)

(52) U.S. Cl.
USPC .......................................... 700/248; 700/230

(58) Field of Classification Search
USPC ............................ 700/213, 230, 214, 95, 248
See application file for complete search history.

(56) References Cited

U.S. PATENT DOCUMENTS

| 5,256,029 | A | * | 10/1993 | Fluck | 414/792.9 |
| 5,921,375 | A | * | 7/1999 | van Laar | 198/471.1 |
| 6,220,424 | B1 | * | 4/2001 | Fluck | 198/468.6 |
| 7,184,855 | B2 | * | 2/2007 | Stingel et al. | 700/216 |
| 8,015,778 | B2 | * | 9/2011 | Tischhauser | 53/475 |
| 2003/0182898 | A1 | * | 10/2003 | Huppi et al. | 53/251 |
| 2009/0057098 | A1 | * | 3/2009 | Helgi | 198/351 |
| 2009/0145670 | A1 | * | 6/2009 | Grundtvig et al. | 177/1 |
| 2009/0223878 | A1 | * | 9/2009 | Grundtvig et al. | 209/617 |
| 2010/0249992 | A1 | * | 9/2010 | Grundtvig et al. | 700/223 |

FOREIGN PATENT DOCUMENTS

| EP | 1754661 A1 | 2/2007 |
| NL | 1000675 C2 | 12/1996 |

OTHER PUBLICATIONS

Dutch Search Report, dated Jul. 9, 2010, from corresponding Dutch application.

* cited by examiner

*Primary Examiner* — Ramya Burgess
*Assistant Examiner* — Thomas Randazzo
(74) *Attorney, Agent, or Firm* — Young & Thompson

(57) ABSTRACT

Transfer assembly for transferring large numbers of products from a supply conveyor to a further position, such as one or more discharge conveyors. It is proposed to use a number of pick-and-place robots to this end, wherein the adjacent operating ranges are positioned along a line, which line extends at a small angle to the conveying direction. Preferably, the discharge conveyor extends parallel to the line and crosses the supply conveyor and is situated above it. In this way, it is possible to transfer large numbers of products using a limited number of transfer robots and to guarantee that all products are removed from the supply conveyor.

19 Claims, 1 Drawing Sheet

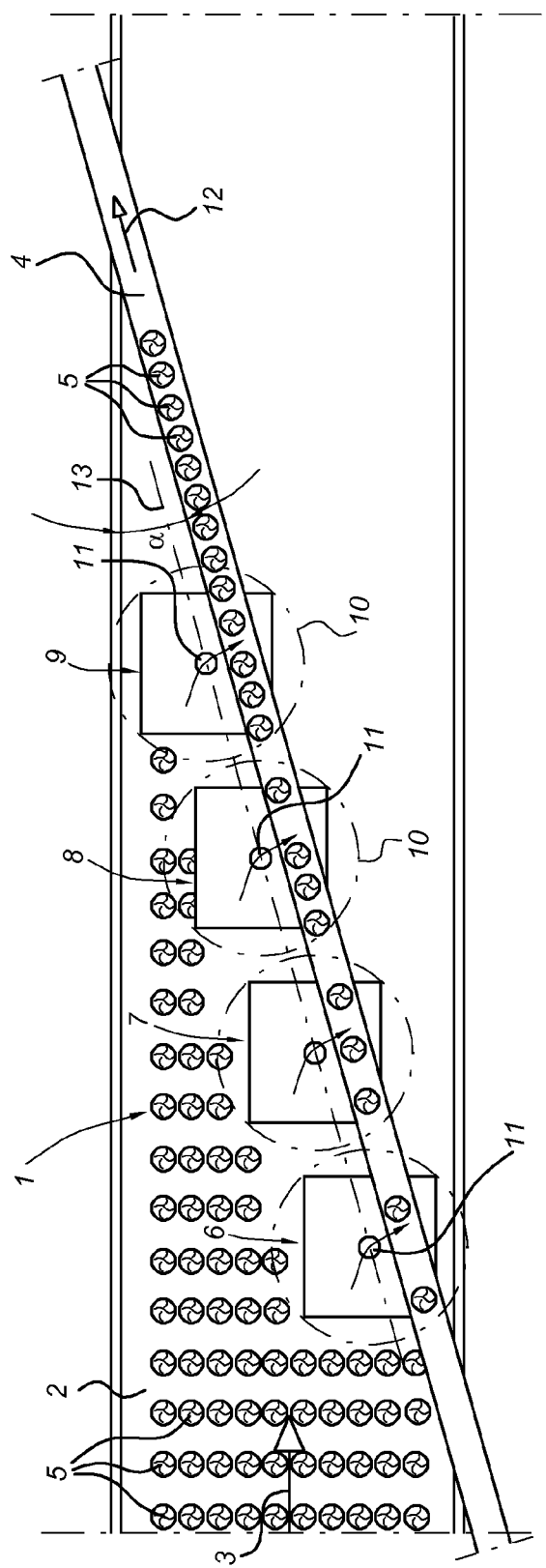

TRANSFER ASSEMBLY

BACKGROUND OF THE INVENTION

The present invention relates to a transfer assembly.

Such transfer assemblies are generally known in the prior art and are used in cases where large numbers of products have to be removed from a supply conveyor and have to be placed elsewhere. Placing products elsewhere may comprise placing them in some form of packaging, but may also comprise "narrowing" a wide row of products to form a narrower row of products.

If the supply conveyor has a large capacity, it has been found to be practical to use various transfer robots, such as pick-and-place robots. In certain embodiments, these are arranged in such a manner that certain transfer robots are situated upstream with respect to other robots. This means that the first robot which is furthest upstream carries out most of the transfer work while the robot which is situated furthest downstream mainly functions as a safeguard to prevent products from not being transferred, which is undesirable. This is preferably controlled by a control unit, making it possible to load the robot which is furthest downstream to a greater degree by monitoring the products to be transferred.

The use of several transfer robots is prompted by the fact that more or less standardized robots are becoming more readily available, usable and increasingly more inexpensive.

It is possible for the transfer robot to place the grasped product on a further conveyor belt which is situated next to the supply conveyor and functions as discharge conveyor. It is possible that a further conveyor belt is present on either side of the conveyor belt and parallel thereto. This is then preferably smaller than the supply conveyor so that a wide row of products which comes, for example, from an oven or the like is configured to form a narrower row. In this case, such belts or other conveyor belts which run parallel to the supply conveyors can move in the same direction as the supply conveyor or opposite thereto.

Another proposal which is known from the prior art is a discharge conveyor which extends at right angles to the supply conveyor.

With products such as food products, but also with other products which are subjected to a (final) treatment on a wide treatment path, such as an oven or the like, the discharge conveyors used in the process are becoming increasingly wide because the capacity of the treatment device steadily increases. This means that the capacity of the transfer robots and discharge conveyor becomes increasingly important in order to be able to transfer large numbers of products.

In order to use the capacity of the transfer robots as efficiently as possible, the path to be travelled by each robot from the supply conveyor to the discharge position has to be as short as possible. However, on the other hand, sufficient measures need to be taken in order to ensure that products which have to be transferred are indeed all placed.

NL 1000675 discloses a transfer device in which a number of discharge belts are arranged next to a supply belt.

SUMMARY OF THE INVENTION

It is an object of the present invention to improve the transfer assemblies known from the prior art, as a result of which a maximum transfer capacity can be created at minimal cost, that is to say using a minimal number of transfer robots.

This object is achieved, according to a first aspect, by an above-described transfer assembly comprising a supply conveyor, first and second transfer robots arranged on either side of said conveyor belt and a discharge position, wherein said robots comprise an operating area with a central area and the central areas of said transfer robots are situated one behind the other in the conveying direction of said supply conveyor, wherein a third transfer robot is provided, which is situated in a direction transversely to said conveying direction between said first and second robot, wherein the central area of said third transfer robot is situated between the central area of said first and second transfer robots in said conveying direction, wherein said discharge position comprises a discharge conveyor and that said discharge conveyor is arranged above it so as to cross the supply conveyor.

According to this aspect of the present invention, the transfer robots are positioned in such a manner that the operating range of the robots together delimits a track which extends at an angle to the supply conveyor which is not perpendicular. As a result thereof, each of the transfer robots can be active while travelling a small path while still covering the entire area of the supply conveyor in a simple manner. All robots are displaced with respect to one another, both in the conveying direction and at right angles thereto.

Preferably, the operating areas of the transfer robots overlap one another, viewed in the conveying direction of the supply conveyor. However, due to the positioning according to the present invention, these operating areas are situated slightly behind one another. This means that the flow of goods which could not be handled by the transfer robot situated furthest upstream due to lack of capacity, can still be grasped by the subsequent transfer robot or transfer robots and be displaced in the desired manner. This makes the system very secure. The same applies to the third transfer robot, the operating range of which (partly) coincides with that of the second transfer robot. As a result thereof, the second transfer robot mainly acts as a safeguard, that is to say to prevent goods from being conveyed by the supply conveyor without having been treated, which is undesirable. However, by observing the products and using a suitable control unit, this second transfer robot can perform a substantial part of the operations. Obviously, there will always have to be sufficient space on the discharge conveyor to place the product from the robot situated furthest downstream. The number of transfer robots can be selected as a function of the width of the supply belt. In principle, there is no maximum number, but preferably at most 6-10 of such robots are used.

The discharge position comprises a discharge conveyor and more particularly a discharge conveyor which extends at an angle of less than 90° to the supply conveyor. More particularly, the angle of the discharge conveyor with respect to the supply direction is between 10° and 50° and more particularly approximately 15°. The discharge conveyor may comprise a movement component which coincides with the conveying direction of the supply conveyor. It is also possible for this component to be exactly opposite to the conveying direction of the supply conveyor. The discharge conveyor may be embodied in any conceivable way. That is to say that it can be embodied as a cleated belt or belt with carrier members. In addition, it can be configured for conveying trays in which the respective products are arranged.

The return part of such a discharge conveyor can be situated both below and above the supply conveyor.

According to a further particular embodiment of the present invention, the operating areas of the various transfer robots define a track through which a line can be drawn which extends parallel to a discharge conveyor which may be present. More particularly, each transfer robot has a central area comprising a centre and the line drawn through these centres is a straight line which runs parallel to the discharge conveyor.

It is possible to transfer all products which are situated on the supply conveyor to the discharge conveyor. However, it is also possible to make a selection. When transferring products to a discharge conveyor, the conveying width of the discharge conveyor is preferably smaller than that of the supply conveyor. That is to say that when the discharge conveyor is discharging all products, it will move at a much higher speed than the supply conveyor in order to be able to accommodate the small number of rows of products. One or more rows may be present.

Naturally, it is possible to arrange various discharge conveyors parallel to one another or arranged in another manner. The supply conveyor and the discharge conveyor may be moving in substantially the same conveying direction, but may also be moving in opposite directions.

By means of the invention, it is possible to transfer large numbers of products from a very wide supply belt to a narrow discharge belt without the robots having to make large turns. As a result thereof, the operating area of the robots can also remain small, making it possible to use small and quick robots which, in addition, are relatively inexpensive.

The invention also relates to a combination, comprising a production device for products and a supply conveyor serving as a discharge for said device and extending away therefrom and a transfer assembly coupled thereto and comprising a supply conveyor, first and second transfer robots arranged on either side of said conveyor belt and a discharge position, wherein said robots comprise an operating area with a central area and the central areas of said transfer robots are situated one behind the other in the conveying direction of said supply conveyor, wherein a third transfer robot is provided, which is situated in a direction transversely to said conveying direction between said first and second robot, wherein the central area of said third transfer robot is situated between the central area of said first and second transfer robots in said conveying direction, wherein said discharge position comprises a discharge conveyor and that said discharge conveyor is arranged above it so as to cross the supply conveyor.

According to a further aspect, the invention also relates to a method for transferring a row of supplied products, wherein, in the supply direction, a large number of products situated next to one another are displaced in the supply direction, to form a row of discharged products, wherein, in the discharge direction, a smaller number of products situated next to one another are displaced in the discharge direction, wherein the discharge direction makes an angle α of 10°-50° with the supply direction and the discharged products are discharged in such a manner that they are situated above the supplied products.

BRIEF DESCRIPTION OF THE DRAWING

The invention will be explained in more detail with reference to an exemplary embodiment illustrated in the drawing. In this case, the sole FIGURE diagrammatically shows a top view of a transfer assembly according to the present invention.

DESCRIPTION OF THE PREFERRED EMBODIMENT

In the sole FIGURE, reference numeral 1 denotes the transfer assembly according to the invention. It consists of a supply conveyor 2 which moves a large number of products 5 in the direction of arrow 3 which are arranged in a number of parallel rows. A discharge conveyor 4 is arranged in such a manner that it is situated above the supply conveyor 2 and is moved at greater speed than the supply conveyor in the direction of arrow 12. The return part of belt 4 may be below the conveyor belt 2 or between the supply and return part of belt 2. A number of transfer robots are present, such as pick-and-place robots 6-9. In this case, the two "outermost" robots 6 and 9 are denoted as first robot 6 and second robot 9. According to the present invention, the intermediate transfer robots 7 and 8 are positioned such that they are not situated on a side of the supply conveyor, but in an area which extends at an angle with respect to the supply conveyor. In other words, the range of each robot which is denoted by reference numeral 10 in each case has a centre 11. The line 13 which is drawn through these centres is an oblique line which makes an angle α with the conveying direction 3 of the supply conveyor. According to the present invention, this angle α is preferably 10°-50° and preferably approximately 15°. Products 5 are transferred to the discharge conveyor 12 by means of the various transfer robots. The transfer robot 6 which is furthest upstream can transfer the largest number of the products. However, by using a suitable detection and control unit, the workload of the various transfer robots can be adapted. Thus, it is possible for all robots to carry out an equal number of operations per unit time or for transfer robot 6 to carry out fewest operations. The operating range of this transfer robot 6 partly overlaps the operating range of the transfer robot 7. The same is also true for the transfer robots 8 and 9. In this way, the last transfer robot 9, that is to say the one which is furthest downstream, only serves, for example, as a safeguard to transfer only a small number of the products. As has been indicated above, the workload between the robots can be selected differently.

It has been found that with this arrangement, it is possible to efficiently transfer a large number of products using a relatively small number of robots or using robots having a relatively limited capacity.

Upon reading the above, the person skilled in the art will immediately be able to think of numerous variants of the invention. Thus, it is possible for the discharge conveyor to move in the direction opposite to arrow 12. In addition, it is possible to install a further discharge conveyor 4 which is situated, for example, on the other side of the range 10, that is to say more to the left in the drawing.

Likewise, it is possible to make the discharge conveyor slightly wider. In the present exemplary embodiment, the discharge conveyor has the width of a product 5.

These and further variants are covered by the scope of the attached claims.

The invention claimed is:

1. A transfer assembly, comprising:
    a supply conveyor (2) having a conveyor belt extending in a lengthwise conveying direction (3), the conveyor belt having first and second sides across from each other in a direction of the width of the conveyor belt, the supply conveyor (2) configured for moving products (5) in the conveying direction (3);
    a discharge conveyer (4);
    a first transfer robot (6) positioned toward the first side of said conveyor belt;
    a second transfer robot (9) positioned toward the second side of said conveyor belt; and
    a third transfer robot situated between said first and second transfer robots (6,9), said first, third, and second robots situated along a line that is transverse to said conveyor belt and oblique with respect to said conveying direction (3), wherein said first, second, and third transfer robots each comprise an operating area with each operating area having a central area (10), the central areas (10) of said first, second, and third transfer robots being situated one behind the other in the conveying direction (3) of said supply conveyor (2) and next to one another in the direction transverse to said conveying direction such that the operating areas cover the width of the supply conveyor, and wherein said discharge conveyor (4) is arranged above said supply conveyor (2), and crosses said supply conveyor (2) and the central areas (10) of said first, second, and third transfer robots such that said first, second, and third transfer robots are arranged along a discharge direction (12) of the discharge conveyor (4) and such that each of said first, second, and third transfer robots can place products (5) picked from said supply conveyor (2) to said discharge conveyor (4).

2. The transfer assembly according to claim 1, wherein each of the central areas (10) of said first, second, and third transfer robots comprises a center (11), the center (11) of each of said central areas (10) being located along a straight line (13) that is transverse to said conveying direction (3).

3. The transfer assembly according to claim 2, wherein said straight line (13) and said conveying direction (3) are transverse with respect to each other by an angle (α) that is between 10° and 50°.

4. The transfer assembly according to claim 2, wherein said straight line (13) makes an angle (α) of approximately 15° with said conveying direction (3).

5. The transfer assembly according to claim 2, wherein said discharge conveyor (4) extends substantially parallel to said straight line (13).

6. The transfer assembly according to claim 5, wherein said supply conveyor (2) is configured to convey n rows of products, and said discharge conveyor (4) is configured to convey at most n/2 rows of products.

7. The transfer assembly according to claim 1, wherein said each of said transfer robots is a pick-and-place robot.

8. The transfer assembly according to claim 1, further comprising:
a fourth transfer robot between said first transfer robot (6) and said third transfer robot.

9. A combination, comprising a production device for products, and a transfer assembly (1) according to claim 1, wherein the supply conveyor (2) of the transfer assembly (1) is configured to function as a discharge for said production device and extends away therefrom.

10. A method for transferring rows of supplied products (5), comprising:
providing a transfer assembly (1) according to claim 1;
displacing, in the conveying direction (3) of the transfer assembly (1), a quantity of rows of products (5) situated next to one another on the supply conveyor (2) of the transfer assembly (1); and
subsequently transferring the products (5), by use of the first, second, and third transfer robots of the transfer assembly (1), to the discharge conveyor (4) of the transfer assembly (1) to form at least one row of discharge products (5) situated next to one another on the discharge conveyor (4), a number of rows of discharge products (5) situated on the discharge conveyor (4) being smaller than a number of rows of products (5) situated on the supply conveyor (2), wherein a discharge direction (12) of the discharge products (5) on the discharge conveyor (4) is angled with respect to the conveying direction (3) by an angle (α) of 10°-50°.

11. The transfer assembly according to claim 1, wherein the discharge conveyor (4) crosses over an entire width of the supply conveyor (2).

12. A transfer assembly, comprising:
a supply conveyor (2) having a conveyor belt extending along a lengthwise conveying direction (3), the conveyor belt having first and second sides across from each other in a direction of a width of the conveyor belt, the supply conveyor (2) configured for moving products (5) in the conveying direction (3);
a discharge conveyer (4);
a first transfer robot (6) positioned toward the first side of said conveyor belt;
a second transfer robot (9) positioned toward the second side of said conveyor belt; and
a third transfer robot between said first and second transfer robots (6,9), wherein, in a vicinity of each of said first, second, and third transfer robots, each respectively have an operational area (10), the operational areas (10) of each of said first, second, and third transfer robots being located above said supply conveyor (2) along an oblique line that is oblique to the conveying direction (3) such that the operating areas of said first, second, and third transfer robots together cover the width of the supply conveyor (2), and wherein said discharge conveyor (4) is arranged above said supply conveyor (2) and crosses over an entirety of the width of said supply conveyor (2), the discharge conveyor extending along the oblique line and through each of the operational areas (10) of said first, second, and third transfer robots in order for each of said first, second, and third transfer robots to relocate products (5) from said supply conveyor (2) to said discharge conveyor (4).

13. The transfer assembly according to claim 12,
wherein respective locations of the first and second transfer robots define a straight line (13) that is oblique with respect to the conveying direction (3), and
wherein said discharge conveyor (4) extends substantially parallel to said straight line (13).

14. The transfer assembly according to claim 13, wherein the straight line is angled with respect to the conveying direction (3) by an angle (α) of 10°-50°.

15. The transfer assembly according to claim 12, wherein respective locations of the first, second, and third transfer robots define a straight line (13) that is oblique with respect to the conveying direction (3).

16. The transfer assembly according to claim 15, wherein said discharge conveyor (4) extends substantially parallel to said straight line (13).

17. The transfer assembly according to claim 16, wherein the straight line is angled with respect to the conveying direction by an angle (α) of 10°-50°.

18. The transfer assembly according to claim 15, further comprising:
a fourth transfer robot positioned along the straight line (13) and between said first transfer robot and said third transfer robot.

19. The transfer assembly according to claim 18, wherein said discharge conveyor (4) extends substantially parallel to said straight line (13).

* * * * *